May 10, 1927.
C. M. ANGELL
1,627,764
BATTERY PLATE PASTING MACHINE
Filed June 16, 1926      3 Sheets-Sheet 1
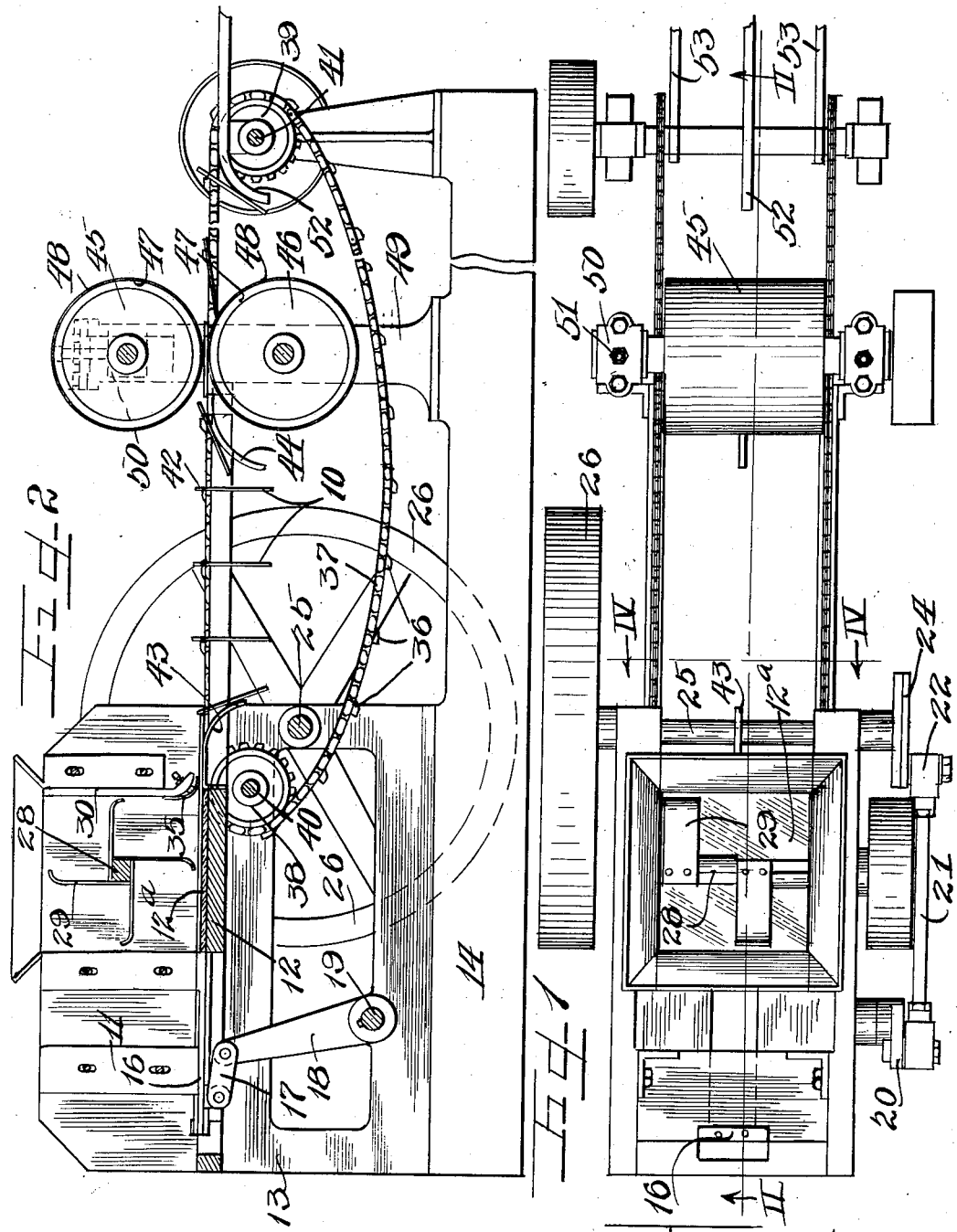
Inventor
Chester M. Angell
by Charles... Attys.

May 10, 1927.
C. M. ANGELL
1,627,764
BATTERY PLATE PASTING MACHINE
Filed June 16, 1926
3 Sheets-Sheet 2
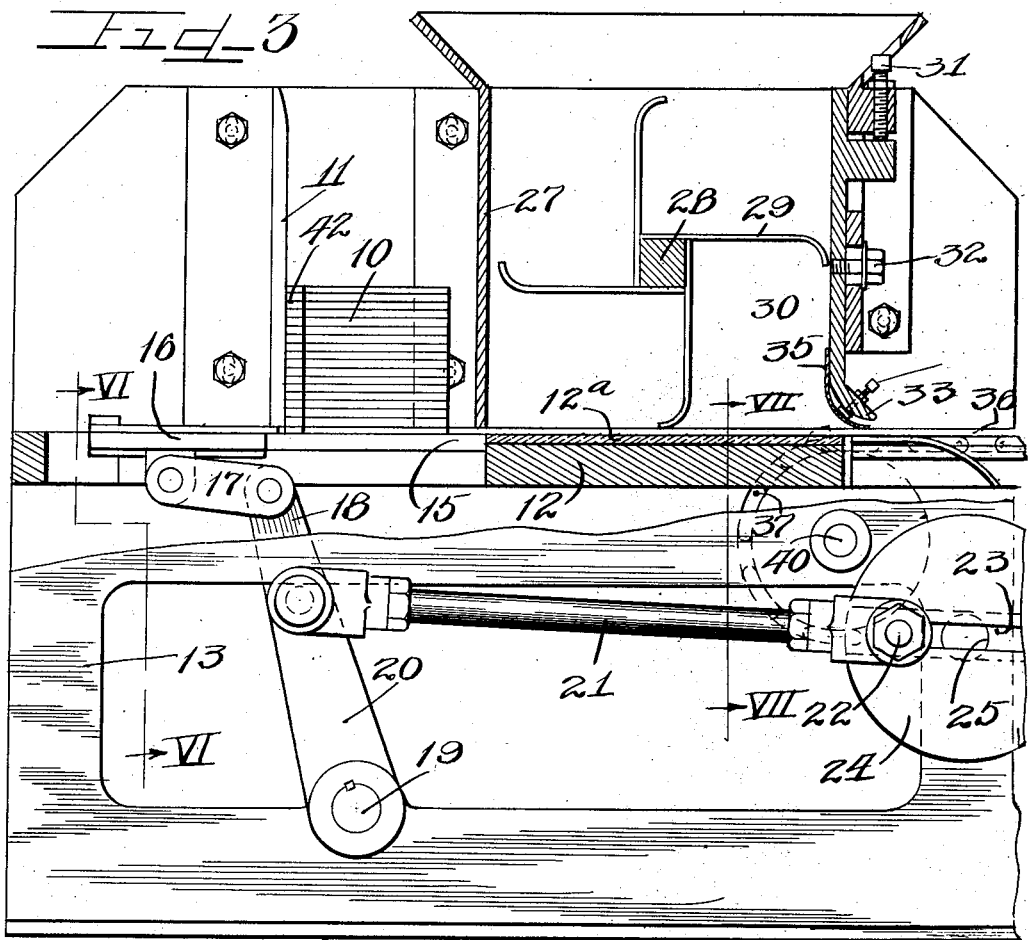
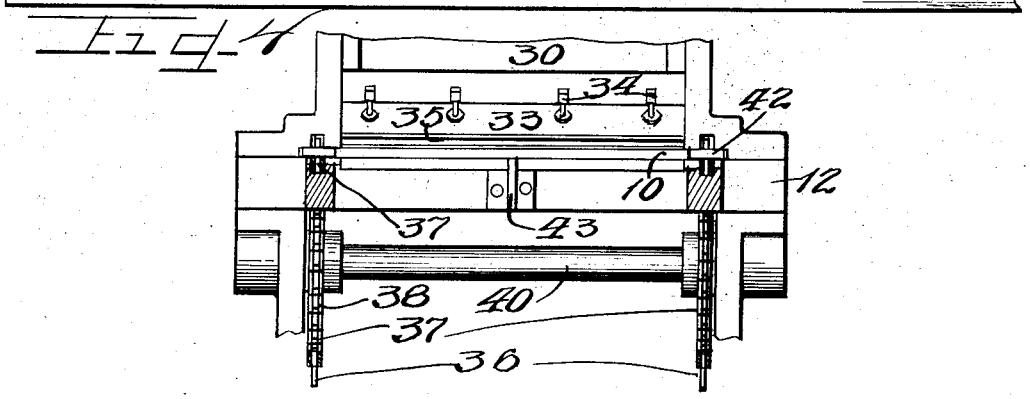
Inventor
Chester M. Angell
by Charles... Attys.

May 10, 1927.  1,627,764
C. M. ANGELL
BATTERY PLATE PASTING MACHINE
Filed June 16, 1926   3 Sheets-Sheet 3
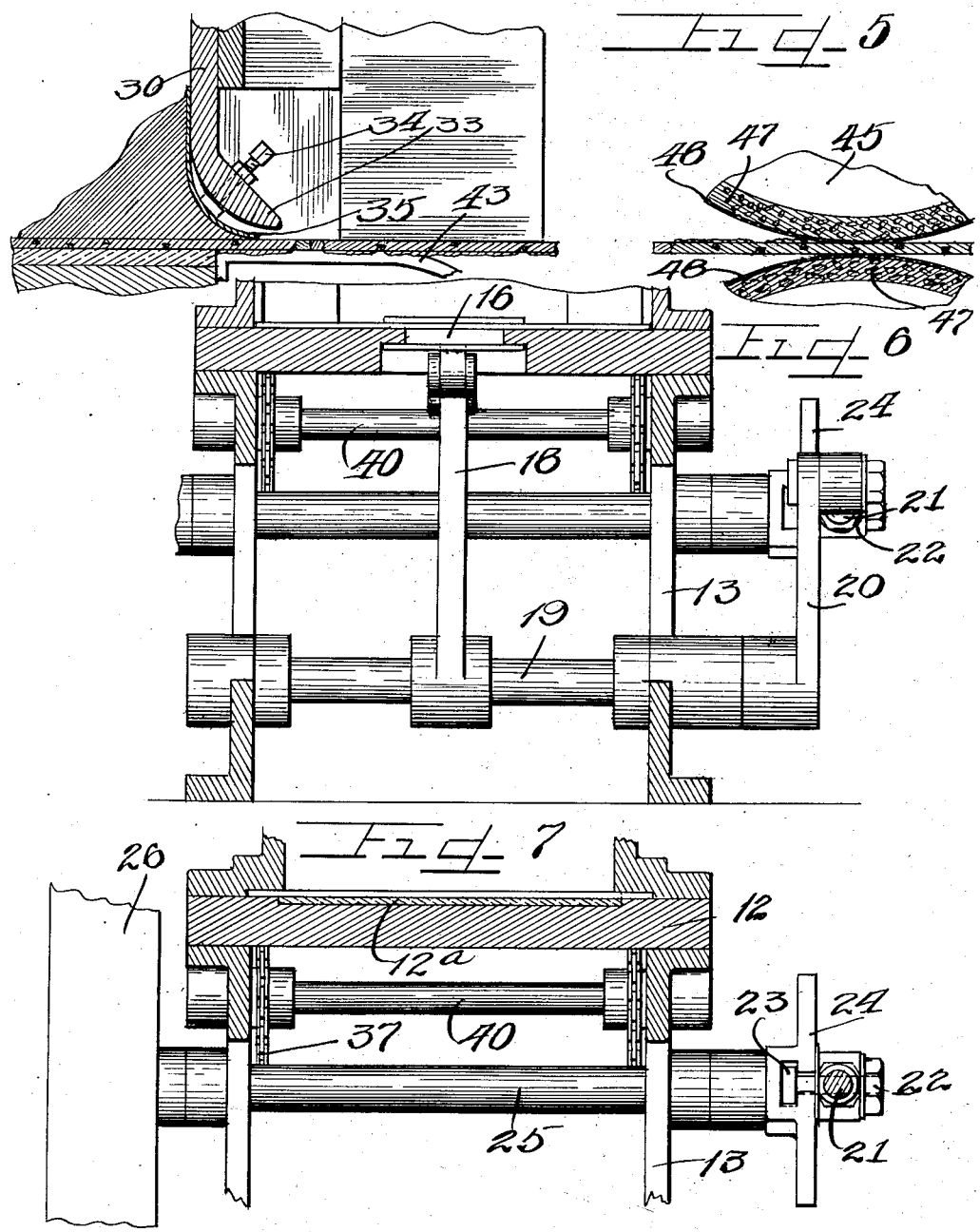

Patented May 10, 1927.

1,627,764

UNITED STATES PATENT OFFICE.

CHESTER M. ANGELL, OF CHICAGO, ILLINOIS, ASSIGNOR TO VESTA BATTERY CORPORATION, OF CHICAGO, ILLINOIS, A CORPORATION OF ILLINOIS.

BATTERY-PLATE-PASTING MACHINE.

Application filed June 16, 1926. Serial No. 116,295.

This invention relates to a machine for filling battery plates or grids with the paste forming the active material thereof.

It is an object of this invention to provide a machine for pasting battery plates which is in some respects an improvement on, and a simplification of the machine shown in my application Serial No. 7490, filed February 7, 1925. In my earlier application referred to I have shown duplicate pasting mechanisms to fill both sides of a grid, while in the present application I show a single pasting mechanism forcing an excess of paste clear through the grid which is then turned over and the excess material forced back into the grid, thus at the same time filling the voids due to pasting from one side only, and compressing the paste into a firm bond with the grid.

It is also an object of this invention to provide an improved form of adjustable plow or towel for forcing a predetermined excess of paste into and through a battery grid.

It is a further object of this invention to provide a simplified grid feeding mechanism adjustable to care for grids of varied sizes.

Other and further important objects of this invention will be apparent from the disclosures in the specification and accompanying drawings.

The invention (in a preferred form) is illustrated in the accompanying drawings and hereinafter more fully described.

On the drawings:

Figure 1 is a top plan view of a device embodying the features of this invention.

Figure 2 is a longitudinal section thereof on the line II—II of Figure 1.

Figure 3 is an enlarged section of the paste box and grid feeding mechanism.

Figure 4 is a fragmentary section on the line IV—IV of Figure 1.

Figure 5 is an enlarged fragmentary section showing the operation of the trowel plate and compressing rolls.

Figure 6 is a section on the line VI—VI of Figure 3.

Figure 7 is a section on the line VII—VII of Figure 3.

As shown on the drawings:

A stack of battery grids is shown at 10, confined in suitable guideways 11 on a table 12, the supporting framework 13 of which is mounted on a board 14 which furnishes a common support for the various elements of the machine. The table 12 is provided with a glass top 12$^a$ to assist in feeding the grids, and is cut away to form a slide 15 for a ram 16 which extends above the table top a sufficient distance to engage the lowermost grid in the stack while sliding under the second or superimposed grid. The glass top 12$^a$ is adjustable back and forth in a horizontal plane relative to a trowel 35 so that it may be positioned relative to said trowel in such a manner as to supply an excess of paste to the grids. The ram is moved to and fro by a link 17 connected to a lever 18 on the shaft 19 which in turn is rocked by a lever 20 actuated by an adjustable length connecting rod 21 from the radially adjustable crank pin 22 bolted in the slot 23 of a face plate 24 on an operating shaft 25 which carries a flywheel 26. The radially adjustable crank pin permits regulation of the length of stroke of the ram, while the adjustable connecting rod permits regulation of the operating range of the ram to assure a return thereof sufficient to clear the left hand side of the stack of grids to allow the stack to drop down and position another grid in front of the ram.

A paste box is located above the table next the grid stack, the front wall 27 of the box being spaced sufficiently away from the table to allow the lowermost grid to be pushed thereunder. The table surface within the box is faced with glass because of the nature of the paste. The box is provided with a horizontal beater shaft 28 having a series of blades 29 thereon for continuously agitating the paste. The rear wall 30 of the box is separately adjustable up and down by the screw 31 and is clamped in adjusted position by the screw 32. The lower end of this rear wall is rounded off as at 33, screws 34 passing therethrough to press against a curved spring plate 35 which functions as a trowel to force paste into and through the grids, the table top or glass ending slightly ahead of the active top of the trowel to allow excess paste to bulge outwardly from the bottom surface of the grids.

The grids are fed to and through the paste box solely by end pressure from the succeeding grids forced into the box by the ram, the grids emerging from the box being engaged by dogs 36 on a pair of side chains 37 which are trained over sprockets 38 and 39 on the shafts 40 and 41. These chains engage each grid by means of the outstanding lugs 42, so that the grids are free to hang in a vertical position after sliding off the horn 43. A similar horn 44 positioned in advance of the squeezing rolls serves to bring the grids back into a horizontal position with the sides reversed, i. e., the chain and the two horns turn each grid over. The reversed grids are drawn between two rolls 45 and 46 which are each formed with a soft or resilient layer such as sponge rubber 47, covered by a fabric 48. The soft surfaced rolls make contact with a considerable area of the grid and thus prevent the pressure imposed on the surplus paste from causing the paste to flow along the interstices of the grid and bulging out again beyond the rolls. These rolls are mounted in a stand 49, the upper roll being hung in adjustable bearings 50 which may be forced down by the screws 51 to give any desired pressure to the rolls.

From the rolls the chain delivers the grids onto guides 52 and 53 from which the completed grids are removed for further operations in the manufacture of batteries.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a machine of the class described, a table, means for feeding grids over said table in a continuous line, means for forcing an excess of paste through said grids as they pass over the edge of the table, means for turning said grids over, and soft surfaced rolls adapted to compress the excess paste back into the interstices of the grids.

2. In a machine of the class described, a table, means for feeding grids over said table in a continuous line, means for forcing an excess of paste through said grids as they pass over the edge of the table, means for turning said grids over, and means adapted to force the excess paste into the voids of the grid and to compress the paste in said grids.

3. In a machine of the class described, a stack of grids, a reciprocating ram adapted to engage and advance said grids one at a time, and means for varying the length of stroke of said ram to care for varying sizes of grids.

4. In a machine of the class described, a stack of grids, a reciprocating ram adapted to engage and advance said grids one at a time, means for varying the length of stroke of said ram to care for varying sizes of grids, and means for varying the range over which the ram operates.

5. In a machine of the class described, a stack of grids, a reciprocating ram adapted to engage and advance said grids one at a time, means for varying the length of stroke of said ram to care for varying sizes of grids, a paste box beneath which said grids are advanced, and a trowel associated with said box adapted to force paste into said grids.

6. In a grid pasting machine, a paste box, means for feeding grids beneath said box, an adjustable rear wall on said box and a trowel secured to said rear wall having an adjustable spring action relative to the lower edge of said wall.

7. In a machine of the class described, a paste box, means for feeding grids beneath said box, and a trowel associated with the rear wall of said box and forming a yielding lower edge therefor.

8. In a machine of the class described, a paste box, means for feeding grids beneath said box, and a trowel associated with the rear wall of said box and forming a yielding lower edge therefor, means for reversing said grids after leaving said box, and means for compressing the paste to fill the voids in said grids.

9. In a machine of the class described a paste box, means for feeding grids beneath said box, and a trowel associated with the rear wall of said box and forming a yielding lower edge therefor, and means for compressing the paste in said grids to fill the voids thereof.

10. In a grid pasting machine, means for applying an excess of paste to the grids and soft surfaced rolls for compressing said excess paste into the interstices of said grid.

11. In a grid pasting machine, a paste box, a floor therefor of smooth material adjustable in a horizontal plane, and a trowel cooperating with an edge of said floor past which an excess of paste is delivered to the grids.

In testimony whereof I have hereunto subscribed my name.

CHESTER M. ANGELL.